United States Patent
Rao et al.

(10) Patent No.: US 10,029,698 B2
(45) Date of Patent: Jul. 24, 2018

(54) ADAPTIVE PASSENGER COMFORT ENHANCEMENT IN AUTONOMOUS VEHICLES

(71) Applicant: Futurewei Technologies, Inc., Plano, TX (US)

(72) Inventors: Lei Rao, Mountain View, CA (US); Jian Li, Austin, TX (US); Ron-Chung Hu, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 69 days.

(21) Appl. No.: 15/213,532

(22) Filed: Jul. 19, 2016

(65) Prior Publication Data

US 2018/0022361 A1    Jan. 25, 2018

(51) Int. Cl.
*B60W 50/00* (2006.01)
*B60R 16/037* (2006.01)
(Continued)

(52) U.S. Cl.
CPC ....... *B60W 50/0098* (2013.01); *B60R 16/037* (2013.01); *B60W 10/30* (2013.01);
(Continued)

(58) Field of Classification Search
CPC .. B60W 50/0098; B60W 10/30; B60W 30/18; B60W 50/085; B60W 2050/0014;
(Continued)

(56) References Cited

U.S. PATENT DOCUMENTS 9,063,930 B2 * 6/2015 Zadeh .................. G06N 7/02
9,164,511 B1 * 10/2015 Ferguson ............. G05D 1/0231
(Continued)

FOREIGN PATENT DOCUMENTS

CN    102109821    6/2011
CN    103496368    1/2014
(Continued)

OTHER PUBLICATIONS

"International Application No. PCT/CN2017/089414, International Search Report and Written Opinion dated Aug. 29, 2017", (Aug. 29, 2017), 12 pgs.
(Continued)

*Primary Examiner* — Calvin Cheung
(74) *Attorney, Agent, or Firm* — Futurewei Technologies, Inc.

(57) ABSTRACT

A system and method for performing self-learning for adaptively achieving passenger comfort enhancement in an autonomous vehicle. The system comprises a plurality of sensor inputs. Each sensor input provides data representative of voice responses and image responses from a passenger in the vehicle. A controller is coupled to the plurality of sensor inputs. The controller generates and updates a reward function that includes a plurality of driving state transitions. The reward function is updated based on destination information and the data representative of the voice and image responses. The controller further generates a goal function that determines an optimized driving state transition updates the goal function based on the updated reward function and a previous goal function. The controller also generates a vehicle speed control signal, based on the updated goal function, to control the speed of the autonomous vehicle.

19 Claims, 5 Drawing Sheets

(51) Int. Cl.
  *B60W 10/30*   (2006.01)
  *B60W 30/18*   (2012.01)
  *B60W 50/08*   (2012.01)
  *G05B 13/02*   (2006.01)

(52) U.S. Cl.
  CPC .......... *B60W 30/18* (2013.01); *B60W 50/085* (2013.01); *G05B 13/028* (2013.01); *B60W 2050/0014* (2013.01); *B60W 2050/0075* (2013.01); *B60Y 2300/18* (2013.01)

(58) Field of Classification Search
  CPC ......... B60W 2050/0075; B60R 16/037; B60Y 2300/18; G05B 13/028
  See application file for complete search history.

(56) References Cited

U.S. PATENT DOCUMENTS

| | | | | |
|---|---|---|---|---|
| 9,304,515 | B2* | 4/2016 | Cudak | G05D 1/0287 |
| 9,469,028 | B2* | 10/2016 | Sisbot | B25J 9/163 |
| 2012/0083960 | A1* | 4/2012 | Zhu | G05D 1/0214 |
| | | | | 701/23 |
| 2012/0303222 | A1* | 11/2012 | Cooprider | B60W 10/06 |
| | | | | 701/48 |
| 2013/0211686 | A1 | 8/2013 | Shono et al. | |
| 2014/0358427 | A1* | 12/2014 | Fuhrman | G01C 21/3602 |
| | | | | 701/452 |
| 2014/0365228 | A1* | 12/2014 | Ng-Thow-Hing | G02B 27/01 |
| | | | | 704/275 |
| 2015/0241231 | A1* | 8/2015 | Abramson | G01C 21/3697 |
| | | | | 701/534 |
| 2015/0246673 | A1* | 9/2015 | Tseng | B60W 30/00 |
| | | | | 701/23 |
| 2016/0001781 | A1* | 1/2016 | Fung | G06F 19/345 |
| | | | | 701/36 |
| 2016/0046300 | A1 | 2/2016 | Wingfield et al. | |
| 2016/0362045 | A1* | 12/2016 | Vegt | H04W 4/00 |
| 2016/0375592 | A1* | 12/2016 | Szatmary | B25J 5/00 |
| | | | | 700/255 |
| 2017/0109603 | A1* | 4/2017 | Wang | G06K 9/4671 |
| 2017/0153714 | A1* | 6/2017 | Gao | G06F 3/017 |
| 2017/0157521 | A1* | 6/2017 | Comploi | A63G 25/00 |
| 2017/0174221 | A1* | 6/2017 | Vaughn | B60W 40/09 |
| 2017/0248952 | A1* | 8/2017 | Perkins | B60W 50/082 |
| 2017/0300762 | A1* | 10/2017 | Ishii | B60R 1/00 |
| 2017/0314953 | A1* | 11/2017 | Glasgow | G01C 21/3484 |

FOREIGN PATENT DOCUMENTS

| | | |
|---|---|---|
| CN | 105373944 | 3/2016 |
| WO | WO-2012047977 | 4/2012 |

OTHER PUBLICATIONS

Kuderer, Markus, et al., "Learning driving styles for autonomous vehicles from demonstration", Robotics and Automation (ICRA), 2015 IEEE International Conference on, (May 26, 2015), 2641-2646.

* cited by examiner

ADAPTIVE PASSENGER COMFORT ENHANCEMENT IN AUTONOMOUS VEHICLES

TECHNICAL FIELD

The present disclosure is related generally to autonomous vehicles and in particular to self-learning, adaptive passenger comfort enhancement in autonomous vehicles.

BACKGROUND

Autonomous vehicles (i.e. self-driving vehicles) are currently being developed that have the ability to convey passengers over public streets to their desired destination without passenger intervention. The development path for these vehicles relies on three key factors: safety, reliability, and comfort.

Unlike safety and reliability, comfort is a subjective factor. Each passenger may define comfort in a different way. Passenger comfort may be influenced by various factors such as vehicle speed, vehicle acceleration, and distance between other vehicles.

Self-learning vehicles conventionally rely on a driver initially driving the vehicle while the self-learning system in the vehicle learns the driver's style of driving from a set of training data from the driver's demonstration. The self-learning system may then later replicate this particular driver's style of driving.

However, such methods depend on the amount of information embedded in the training data and may not work well for situations not covered by the training data. Furthermore, some vehicles (e.g., rental vehicles) are not available to be initially driven by an individual. Other vehicles (e.g., fully autonomous vehicles) may lack the controls (e.g., steering wheel, accelerator/brake pedals) to be driven by an individual.

SUMMARY

A system to perform self-learning for adaptively achieving passenger comfort enhancement in an autonomous vehicle. The system includes a plurality of sensor inputs to obtain data representative of voice responses and image responses of a passenger in the vehicle. A controller is coupled to the plurality of sensor inputs. The controller generates and updates a reward function comprising a plurality of driving state transitions. The reward function is updated based on a received destination and the voice and image responses from the passenger. The controller further generates and updates a goal function that determines an optimized driving state transition. The goal function is updated based on the updated reward function and a previous goal function. The controller further generates a vehicle speed control signal based on the updated goal function.

DETAILED DESCRIPTION

Some of the challenges noted above, as well as others, can be addressed by an adaptive passenger comfort enhancement system and method. For example, the system monitors passenger feedback (e.g., facial expression, audio responses) in response to a driving situation to estimate that passenger's level of comfort. The passenger feedback is then used to generate a reward function that provides a weighted indication of passenger comfort based on the various feedback elements. A goal function for a particular route may then be generated based on the reward function, vehicle position, vehicle route, and passenger input parameters. The goal function, dynamically updated by passenger feedback in the reward function, provides control of the vehicle speed and acceleration over that particular route.

Figure 1:
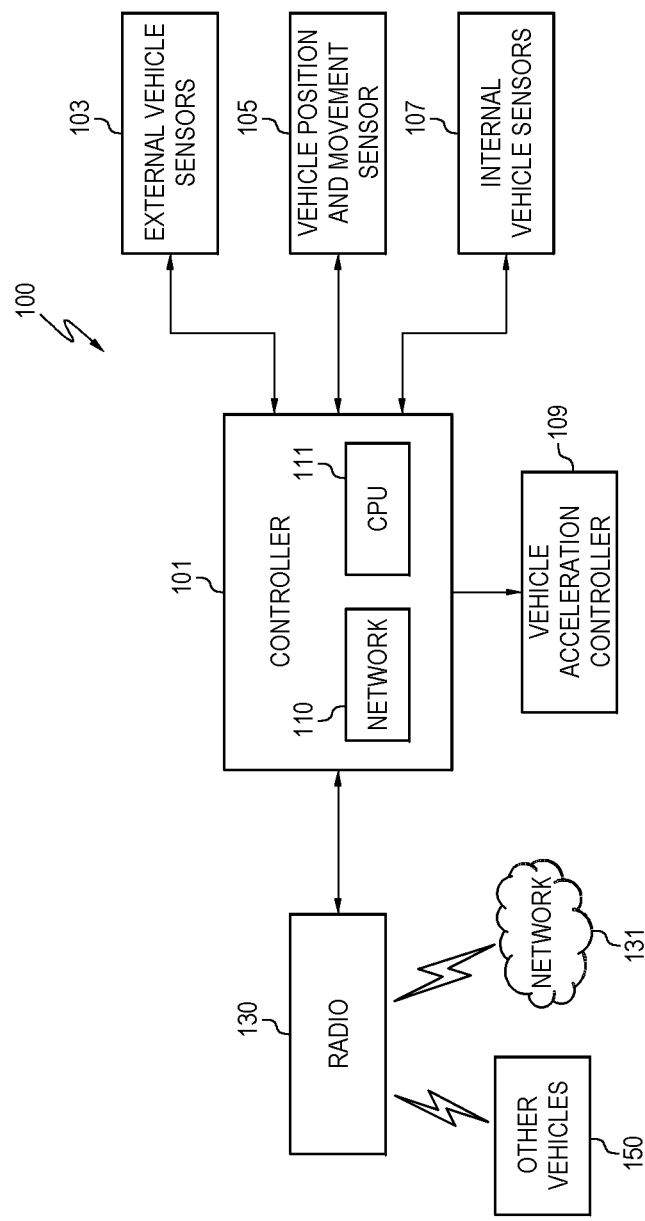
FIG. 1 is a block diagram of an adaptive passenger comfort enhancement system, in accordance with various embodiments.

FIG. 1 is a block diagram of an adaptive passenger comfort enhancement system 100, in accordance with various embodiments. This system 100 is for illustration purposes only as the method for adaptive passenger comfort enhancement may be executed in other systems with substantially similar results.

The system 100 includes a system controller 101 that controls operation of the system and is configured to execute the method for adaptive passenger comfort enhancement. The controller 101 includes a central processing unit (CPU) 111 such as digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein.

The controller 101 may also include memory 110. The memory 110 may include read-only memory (ROM), random-access memory (RAM), magnetic disk storage media, optical storage media, flash-memory devices, and/or other storage devices and media.

The controller 101 is coupled to various sensors 103, 105, 107 as inputs to the controller 101. For example, external vehicle sensors 103 may be mounted on the exterior of the vehicle to provide the controller 101 with continuous updates of the environment surrounding the vehicle. The external vehicle sensors 103 may include a distance measuring sensor (e.g., radar, laser) for measuring distances between other vehicles in front, trailing, or adjacent to the vehicle. The external vehicle sensors 103 may further include image sensors, light sensors, or any other sensor that may be used to detect, measure, and/or map the external environment surrounding the vehicle.

A vehicle position and movement sensor 105 (e.g., global positioning system (GPS), inertial, accelerometer, compass, gyroscope) are coupled to and may provide the controller 101 with continuous updates on vehicle speed, acceleration, and/or direction. The controller 101 may use the position and movement data as feedback to determine whether its control of the vehicle is performing as intended.

In-vehicle sensors 107 may be mounted inside the vehicle and are coupled to and provide the controller 101 with updates as to passenger comfort. For example, the in-vehicle sensors 107 may include aural devices (e.g., microphones, speakers), haptic sensors (e.g., vibration), image sensors, seat sensors to determine if a weight is on a particular seat, temperature sensors as well as any other sensor that may be used to assist in determining passenger comfort.

The controller 101 is further coupled to a radio 130 to provide wireless communication with a network 131 or other vehicles 150. The controller 101 may use the radio 130 to communicate with the Internet through an access point (AP) or a cellular base station in order to download data or upload its position, route, destination, and/or movement. The controller 101 may also communicate this information with other vehicles 150 or with roadside structures.

A vehicle acceleration controller 109 is coupled to the controller 101 and receives control information from the controller 101. For example, after execution of the adaptive passenger comfort enhancement method, the controller 101 may provide the control data (e.g., acceleration, speed) to the vehicle acceleration controller 109 to control the speed and acceleration of the vehicle.

The system 100 of FIG. 1 is used to execute instructions for generating the reward function (e.g., reward matrix) based on passenger feedback. The goal function may then be generated based on the reward function, vehicle movement, desired route, and passenger input parameters.

Figure 2:
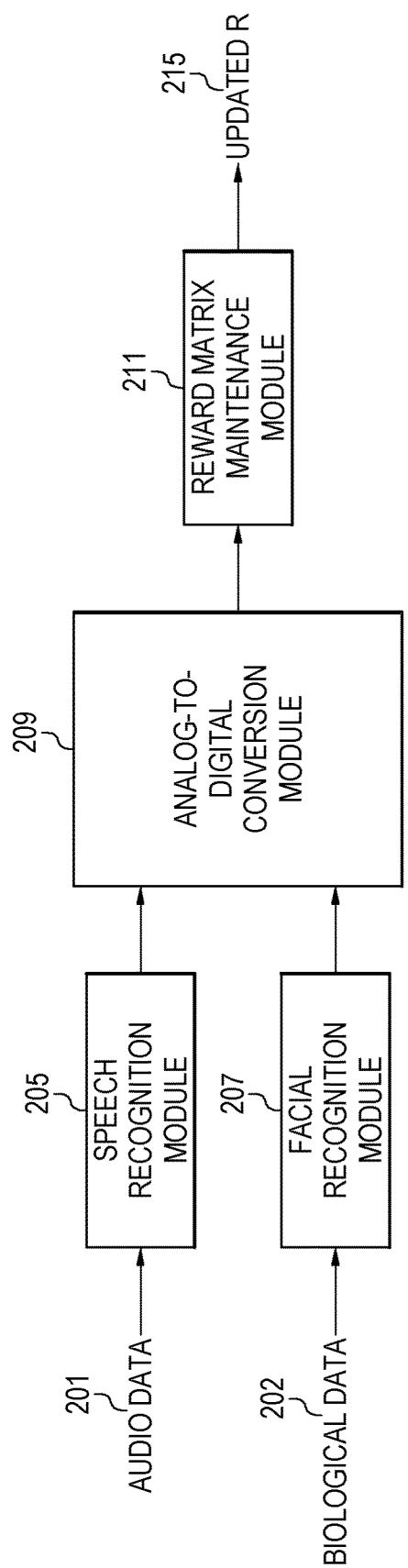
FIG. 2 is an operational flow diagram of a method for generating a reward function, in accordance with various embodiments.
Figure 3:
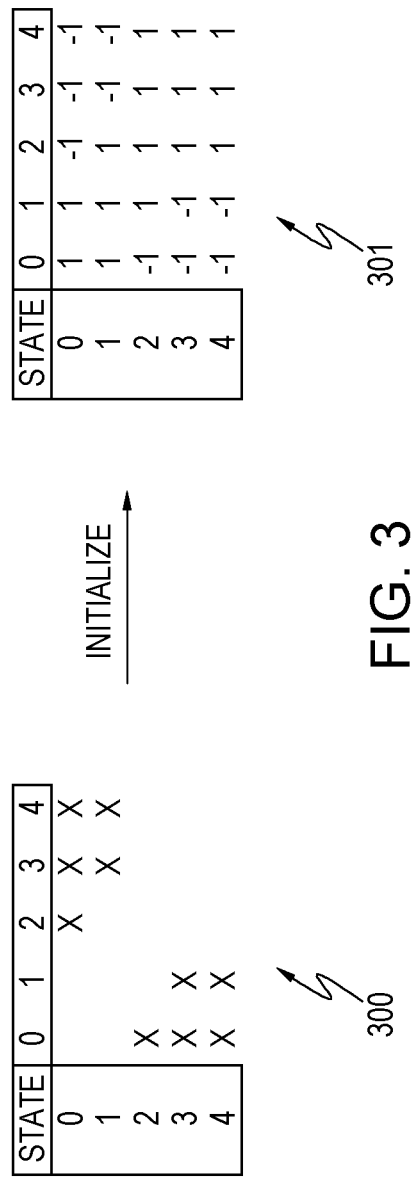
FIG. 3 is a reward function in the form of a matrix, in accordance with various embodiments.

FIG. 2 is an operational flow diagram of a method for generating a reward function, in accordance with various embodiments. The various blocks shown in FIG. 2 may be modules that represents software, hardware, or both software and hardware. The reward function may be expressed in the form of a reward matrix as illustrated in FIG. 3.

The reward function uses passenger feedback in the form of audio data 201 and biological data (e.g., facial expressions) 202. For example, the system 100 of FIG. 1 may ask the passenger, through a display or an aural announcement over a speaker, if the passenger is comfortable. The aural response from the passenger is input to a speech recognition algorithm module 205 that determines how the passenger responded.

The speech recognition algorithm module 205, using a known speech recognition process, converts the sound of the passenger's voice response into a digital representation of that response (i.e., data representative of the voice response). For example, the speech recognition algorithm module 205 may convert the passenger's aural response of "bad" or "good" into a negative or positive digital representation of "bad" or "good", respectively. In other embodiments, a speech analyzer may be used to determine emotion associated with the passenger's voice response such as strained or excited.

The digital representation of the passenger's aural response is input to the analog-to-digital conversion module 209 for conversion into a binary representation of the digital representation of the passenger's aural response. For example, the analog-to-digital conversion module 209 may assign a first binary representation (e.g., logical "1") to a positive aural response (e.g., "good", "fabulous", "great", "excellent") and a second binary representation (e.g., logical "0") to a negative aural response (e.g., "bad", "horrible", "terrible"). Other embodiments may assign other binary representations for the positive and negative responses. These binary representations are then used in updating the reward matrix maintenance algorithm module 211, as described subsequently.

The passenger's facial expression may represent their comfort level as the vehicle moves. Thus, as the vehicle accelerates, decelerates, and/or traverses different road curvatures at different speeds, the passenger's facial expression may change to exhibit changing comfort levels responsive to the changing vehicle movement.

The facial expression 202 of the passenger is input to a facial recognition algorithm module 207. The facial recognition algorithm module 207, using a known facial recognition process, converts the passenger's facial response into a digital representation of that response (i.e., data representative of the image response). For example, if the vehicle enters a curve at a relatively high rate of speed such that it causes discomfort to the passenger, the passenger's facial expression may become a grimace. Conversely, if the vehicle is traveling at a relatively sedate speed along a straight road, the passenger's facial expression may be neutral or a smile. The facial recognition algorithm module 207 converts these facial responses to their respective digital representations (e.g., grimace, smile, neutral) and inputs the representation to the analog-to-digital conversion module 209.

The analog-to-digital conversion module 209 converts the digital facial representations to binary representations of the facial expressions for updating by the reward matrix maintenance algorithm module 211 as described subsequently. For example, the analog-to-digital conversion module 209 may assign a binary value of logical "1" to a smile, neutral, or other positive facial expression and a binary value of logical "0" to a grimace or other negative facial expression.

The reward matrix algorithm module 211 accepts the binary response outputs from the analog-to-digital conversion module 209 and uses these binary values to update a previous iteration of the reward matrix. For example, as described subsequently, the reward matrix may be initialized with certain values when the passenger's trip first begins. The binary response outputs from the analog-to-digital conversion module 209 are then used to update the initial reward matrix to provide an updated reward matrix 215. If the vehicle is already moving and the initial matrix has already been updated, these binary response outputs are used to update the previous reward matrix and provide the updated reward matrix 215.

FIG. 3 is a reward function in the form of a matrix, in accordance with various embodiments. This representation of the reward function is for purposes of illustration only as other representations may be used such as different numbers of states or different representations for the initial reward function values of each state.

The reward function uses a state variable (S[v,c]) to represent the speed (i.e., v) of the vehicle and the curvature of the road (i.e., c). The vehicle speed and road curvature have been discretized and the speed and curvature variables each represent different speed and curvature ranges, respectively.

The speed variable may be determined as described previously with reference to the system of FIG. 1. For example, the speed may be determined by the vehicle position and movement sensors 105. Road curvature may be determined, for example, as illustrated in FIG. 4.

Figure 4:
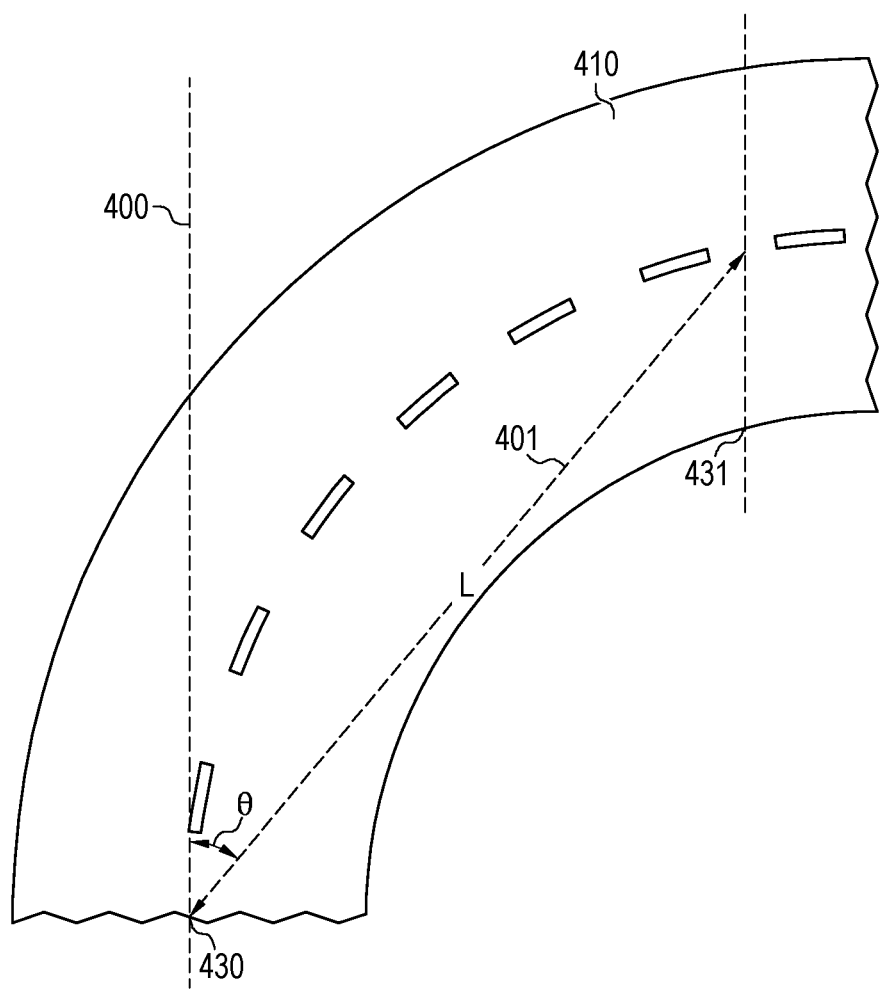
FIG. 4 is a diagram showing a road curvature, in accordance with various embodiments.

FIG. 4 is a diagram showing a road curvature, in accordance with various embodiments. The definition of road curvature illustrated in FIG. 4 is only one possible road curvature representation. Other embodiments may define road curvature in other ways.

FIG. 4 illustrates a road segment 410 having a curve. A vertical tangent line 400 is drawn tangent to the road centerline. A fixed chord length L 410 is drawn between a starting point 430 and an ending point 431 of the road segment 410. The angle θ between the vertical tangent line 400 and the chord 410 is defined as the road curvature.

Referring again to FIG. 3, in a representative embodiment that includes five different states (i.e., 0-4), each state represents different vehicle speed and road curvature ranges. For example, State 0=[0-10 miles per hour (mph), 0-5 degrees], State 1=[10-20 mi/h, 5-10 degrees], State 2=[20-30 mi/h, 10-15 degrees], State 3=[20-30 mi/h, 15-20 degrees], and State 4=[10-20 mi/h, 15-20 degrees]. These speed and curvature ranges assigned to each state are for purposes of illustration only as the speed and curvature variables may represent different ranges for different states.

The left reward matrix 300 of FIG. 3 illustrates an example where an "x" indicates where a transition from one state to another state cannot be accomplished. For example, using the previously defined example states (e.g., State 0, State 1, State 2, State 3, State 4), it can be seen that a transition from State 2 (20-30 mph, 10-15 degrees) to State 0 (0-10 mph, 0-5 degrees), or vice versa, cannot be accomplished. Similarly, transitions from States 3 and 4 to either of States 0 or 1, or vice versa, also cannot be accomplished. This is represented in the left reward matrix 300 by an "x" in each of these positions.

The reward matrix may then be initialized starting with these "x" values. If the reward matrix R is represented by $R_{ij}$, $R_{ij}=-1$ represents that a transition from state i to state j cannot be accomplished and $R_{ij}=1$ represents that a transition from state i to state j can be accomplished (i.e., where $R_{ij} \neq -1$).

An updated reward function matrix 301 is illustrated in FIG. 3. Each state transition represented by a "−1", or some other non-transition indication, is not updated later using the passenger feedback since those state transitions are not possible. However, state transitions represented by "1", or some other transition indication, may be updated later by an updated reward function faclue determined based on the passenger feedback. The transition indications may be increased by the passenger feedback in order to provide guidance for a vehicle speed control policy.

After the reward matrix R has been initialized, it may be updated and maintained by feedback from the passenger. The reward matrix update process may be defined as follows:

```
Loop
    as transition from State i to State j where R_ij ≠ -1 & i ≠ j
    if R_ij = 1 {
        if Facial Expression = 'positive', R_ij = Base;
        elseif Facial Expression = 'negative', R_ij = R_ij;
    }
        if Speech Representation = 'positive', R_ij = min { R_ij + Bonus, X*Base};
        elseif Speech Representation = 'negative', R_ij = max{ R_ij - Bonus, 1 };
        elseif Speech Representation = NULL, R_ij = R_ij;
End Loop
``` where State i, State j, and $R_{ij}$ were defined previously, X is a system configuration weight parameter and may be an integer larger than 1 but less than a predetermined boundary, and Base and Bonus may be certain weighting values (e.g., Base=10, Bonus=4) for each of those feedback parameters. The weight parameter X does not change in the methods disclosed herein.

It can be seen from the reward matrix update process that as the vehicle transitions from a first state (e.g., State i) to a second state (e.g., State j) where the transition is possible and it is not a transition to the same state, it is determined if the facial expression feedback is positive feedback (e.g., 'good') or negative feedback (e.g., 'bad'). Positive facial expression feedback results in the reward function value being increased to a particular value (e.g., Base) greater than the initial value while negative facial expression feedback results in maintaining the reward function at a current value. Similarly, positive speech representation feedback results in the reward function value being increased to the smallest of $R_{ij}$+Bonus or G*Base while negative speech representation feedback results in the reward function value being decreased by the largest of ($R_{ij}$−Bonus) or 1. If the speech representation feedback is neutral, the value of $R_{ij}$ does not change. This is only one implementation of award-level calculation. Other implementations can also work in the proposed system architecture.

It can be seen from the above process that the passenger's audio feedback carries an increasing weight with successive positive feedback of one state transition and it can exceed the weight of the facial expression feedback. This is due to the inherent inaccuracies with determining human facial expressions as compared to the passenger stating verbally that their comfort is good or bad. While the facial expression is taken into account in the process, the audio feedback is considered more accurate and, thus, is relied on more than the facial expression feedback.

Figure 5:
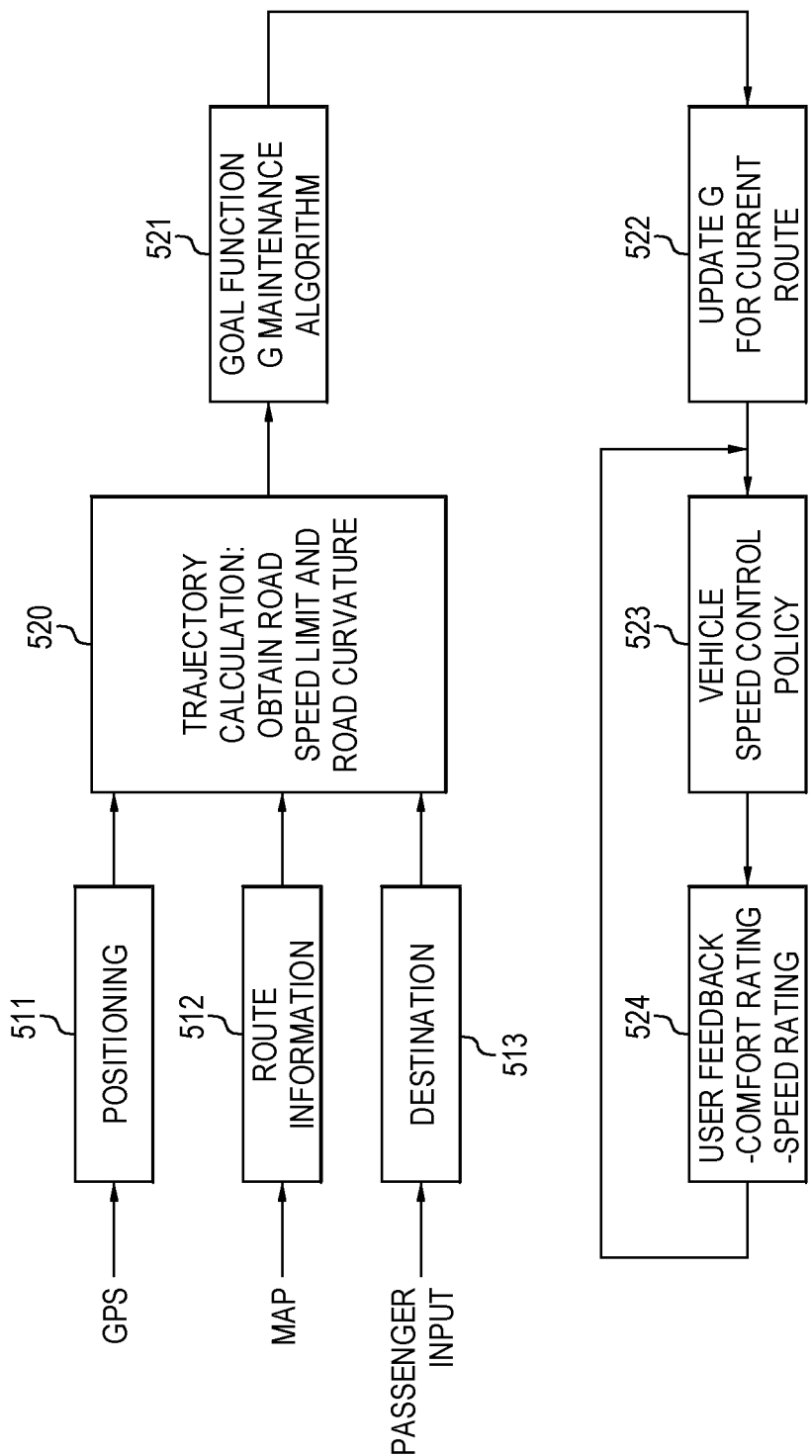
FIG. 5 is a goal function and vehicle speed policy control operational flow diagram, in accordance with various embodiments.

FIG. 5 is a goal function and vehicle speed policy control operational flow diagram, in accordance with various embodiments. The various blocks shown in FIG. 5 may be modules that represents software, hardware, or both software and hardware.

Various parameters 501-503 are entered into the process. For example, these parameters may be GPS data 501, map data 502, and user inputs 503.

The GPS data is input to a positioning module 511 to determine an initial position of the vehicle in some geographic coordinate system (e.g., latitude, longitude). The GPS data, measured from the sensors, represents any navigational input data that may be used. For example, a GPS receiver, an inertial navigation device, a combination of accelerometer/compass/gyroscope, or any other way of determining the vehicle's position relative to some coordinate system may be used.

The map data is input to a route information module 512. The map data represents the geographic coordinate system that was used to determine the position of the vehicle. The map data and the route information may also include road information, such as road location, length, curvature, and designation (e.g., name), with reference to the geographical coordinate system.

The passenger input data is input to a destination module 513. The passenger input data represents the data input by the passenger to tell the system the desired destination referenced to the geographic coordinate system. The desired destination may be referenced to the current location and is based on the same geographic coordinate system as in the map data and GPS data.

The vehicle position 511, route 512, and destination 513 are input to a trajectory calculation module 520 that determines the source-destination route (e.g., roads) to take to reach the desired destination based on the input data (e.g., vehicle position, vehicle destination, map roads). This module 520 obtains route information that may affect the passenger's comfort level and is used in the reward function discussed previously. For example, this module 520 obtains road speed limits and road curvatures, based on GPS data, on the determined route between the present vehicle position (i.e., source) and the desired destination (i.e., destination).

As used subsequently in a goal function G, the source-destination route is represented by P where $P_1[l_1, c_1], \ldots P_t[l_t, c_t]$ represent route segment states (e.g., road segments) of the source-destination route P. The variables $l_1 \ldots l_t$ represent speed limits for each route segment. $c_1 \ldots c_t$ represent curvature range information of each route segment, and t represents a route segment number.

The trajectory result and route information is input to a goal function G maintenance algorithm 521. The goal function G is based on the reward function R, as described previously, and may also be represented by an M×M matrix G(goal, state) where "goal" is the next desired state and "state" is the current state. The goal function matrix G(goal, state) is initialized to zero and the matrix size M is determined by $[0, \max(l_t)]*[0, \max(c_t)]$.

While the reward function matrix indicates the transition from one state to another state, the goal function matrix indicates an optimal route to achieve the transition from one state to another state. In other words, the goal function matrix indicates an optimal route for passenger comfort enhancement (i.e. from goal function) based on vehicle speed and road curvature (i.e. from reward function).

In module 522, the initialized goal function G is updated for the source-destination route. This update may be represented by:

For t=1:T
For all $S_i[v_i, c_t]$ \in $P_t[l_t, c_t]$
Set $S_i[v_i, c_t]$ as current state;
Select one amongst all possible actions for the current state.
Using this possible action, consider going to the next state.
Get maximum G value for this next state based on all possible actions:

---

Compute: G(state, action) = R(state, action) + Gamma * max[G(next state, all actions)]
  Set the next state as the current state.
  End For
End For

--- where T represents a maximum number of route segments used to traverse the source-destination route and Gamma represents a learning parameter and may be initialized to a predetermined value in a range from 0 to 1. The learning parameter G is not updated and may be chosen according to empirical research prior to operation of the system. It can be seen that the system adaptively maintains and updates the goal function G for the source-destination route as the reward function R is updated by user feedback.

The above function may be described as, for each road segment from t to T, considering $S_i$ as a state, the state needs to fall into an allowed range. In other words, the state $S_i$ needs to follow the road curvature (in a given range of degrees) and the speed cannot be greater than the speed limit (l) for that particular route segment t. Then, considering all of the possible next-state transitions (for example, see FIG. 3), the next state is chosen that maximizes the G function (i.e., G(state, action)=R(state, action)+Gamma*max[G(next state, all actions)]). The goal function matrix is maintained for each particular source-destination route by dynamically updating each G(state, action) as the reward matrix is updated by passenger feedback.

The final output of the goal function represents a vehicle speed and/or acceleration. By dynamically updating the vehicle speed or acceleration over various road segments having different curvatures and based on passenger comfort feedback and the updated goal function, the passengers' comfort may be changed. The updated goal function output is represented by the vehicle speed control policy module 523. The vehicle speed control policy module 523 for the source-destination route is represented as follows:

Given G, $P_1[l_1, c_1], \ldots, P_t[l_t, c_t], \ldots$
Calculate $S_1[v_1, c_1] \ldots, S_t[v_t, c_t], \ldots$ for $$\max[w_1 \Sigma_t v_t + w_2 \Sigma_{t \in [2,T]} G(S_{t-1}, S_t)]$$

Update $w_1$, $w_2$ using user feedback $$w_1 = w_1*(1+(RS-rs)/RS)$$

$$w_2 = w_2*(1+(RC-rc)/RC)$$

where the "$w_1 \Sigma_t v_t$" in the above optimization equation represents maximizing the total achieved speed with the state transition control, "$w_2 \Sigma_{t \in [2,T]} G(S_{t-1}, S_t)$" in the above optimization represents maximizing the total passenger comfort with the state transition control, $w_1$ and $w_2$ are system configured weights according to passengers' preference, $v_1, v_t, \ldots$ are decision variables for each segment on the route, rc is the comfort rating from passenger feedback, rs is the speed rating from passenger feedback, and RC and RS are the highest ratings for the comfort and speed ratings rc and rs, respectively. The passenger feedback for the comfort rating and the speed rating for updating the vehicle speed control policy 523 are illustrated in module 524. The speed control policy 523 includes the vehicle speed control signal to control the speed of the vehicle.

The comfort and speed ratings rc and rs may be obtained through an in-vehicle human-machine interface that can have multiple implementations. For example, the comfort and speed ratings rc and rs may be collected through an audio interaction with the passenger by the vehicle system asking the passenger for the scores. In another embodiment, the comfort and speed ratings may be collected by the vehicle system requesting by and receiving an input on a screen inside the vehicle. Other embodiments may use other methods for collecting the comfort and speed ratings rc and rs. The RC and RS ratings may be defined as the highest values of their respective rc and rs ratings over a predetermined interval (e.g., time).

Thus, the method of FIG. 5 accepts passenger input of a destination and generates a route (i.e. trajectory) from the source to the selected destination. The initial reward function, comprising a plurality of driving state transitions, is updated based on the destination and the voice and image responses from the passenger. The goal function determines an optimized driving state transition from a first state to a second state. The goal function is updated based on the updated reward function and a previous goal function. A vehicle speed control signal is generated based on the updated goal function. The vehicle speed control signal is coupled to the vehicle acceleration controller 109 to control the acceleration and speed of the vehicle.

The optimized driving state transition may be defined as a maximized (i.e. highest) vehicle speed. The controller further assigns weights to the maximized vehicle speed and to the updated goal function where the weights are based on the voice or image responses from the passenger.

Conventional self-learning vehicles require that a driver drive the vehicle at least once in order to learn the driver's style and desired comfort. The present embodiments of system and methods for adaptive passenger comfort enhancement provide a self-learning system that does not need an initial vehicle operation in order to dynamically update vehicle speed based on passenger feedback. Using the passenger feedback, the personalized reward and goal functions may be updated to adjust the vehicle speed.

Disclosed implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a computer. For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The previous description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The Abstract is provided with the understanding that it will not be used to limit or interpret the scope or meaning of the claims. The following claims are hereby incorporated into the detailed description, with each claim standing on its own as a separate embodiment.

What is claimed is:

1. A system to control an autonomous vehicle, the system comprising:
   a plurality of sensors generating one or more data representative of a voice response or an image response of a passenger after a first transition from a first driving state to a second driving state, wherein each driving state corresponds to a range of vehicle speed; and
   a controller coupled to the plurality of sensors and configured to:
      determine a first transition indication including a third driving state and a first action based on a reward function with the one or more data as a first variable, with the first action identifying a potential second operation of the autonomous vehicle during a second transition from the second driving state to the third driving state;
      determine at least one next driving state and at least one next action based on the second driving state and a reward matrix, with each next driving state of the at least one next driving state corresponding to one of the at least one next action;
      determine a second transition indication including a fourth driving state and a second action based on the first transition indication, the at least one next driving state, and the at least one next action; and
      generate a vehicle speed control signal based on the second action.

2. The system of claim 1, wherein the reward matrix includes a plurality of driving states, and an indication of each transition from one driving state to another driving state.

3. The system of claim 2, wherein the reward function is based on the reward matrix and includes the one or more data as a first variable.

4. The system of claim 1, wherein each driving state further corresponds to a range of road segment curvature.

5. The system of claim 4, wherein the controller is further configured to generate a vehicle curvature control signal.

6. The system of claim 1, wherein the controller determines the fourth driving state and the second action based on a goal function which includes the third driving state and the first action as a second variable and includes the at least one next driving state and the at least one next action for each next driving state as a third variable.

7. The system of claim 2, wherein the transition from the one driving state to the another driving state comprises one or more transitions and one or more non-transition indications indicating possibilities for transitioning from the one driving state to the another driving state.

8. The system of claim 1, with the controller determining a first transition indication comprising:
   the controller determines a third transition indication based on the reward function with the first variable comprising the image response; and
   the controller determines a fourth transition indication based on the reward function with the first variable comprising the voice response.

9. The system of claim 8, wherein the third transition indication is less priority than the fourth transition indication with successive positive feedback collected from the one or more data being representative of the voice response.

10. The system of claim 1, wherein the controller is further configured to determine a plurality of road segments between a source and a destination, wherein the controller generates the vehicle speed control signal for each of the plurality of road segments based on an updated goal function for each road segment.

11. A method of operating an autonomous vehicle, comprising:
   generating one or more data representative of a voice response or an image response of a passenger after a first transition from a first driving state to a second driving state, wherein each driving state corresponds to a range of vehicle speed;
   determining a first transition indication including a third driving state and a first action based on a reward function with the one or more data as a first variable, with the first action identifying a potential second operation of the autonomous vehicle during a second transition from the second driving state to the third driving state;
   determining at least one next driving state and at least one next action based on the second driving state and a reward matrix, with each next driving state of the at least one next driving state corresponding to one of the at least one next action;
   determine a second transition indication including a fourth driving state and a second action based on the first transition indication, the at least one next driving state, and the at least one next action; and generating a vehicle speed control signal based on the second action.

12. The method of claim 11, wherein each driving state further corresponds to a range of road segment curvature.

13. The method of claim 11, further comprising converting the one or more of data of the image response to a binary representation of a passenger facial expression, wherein a first binary representation of the passenger facial expression is assigned to a positive facial expression and a second binary representation of the passenger facial expression is assigned to a negative facial expression.

14. The method of claim 13, wherein the one or more of data representative of the voice response comprises an aural response from the passenger.

15. The method of claim 14, further comprising: converting the aural response to a binary representation of the aural response, wherein a first binary representation of the aural response is assigned to a positive aural response and a second binary representation of the aural response is assigned to a negative aural response.

16. A non-transitory computer-readable storage medium that stores instructions for execution by processing circuitry of an autonomous vehicle to perform operations that:
    obtain one or more data representative of a voice response or an image response of a passenger after a first transition from a first driving state to a second driving state, wherein each driving state corresponds to a range of vehicle speed;
    determine a first transition indication including a third state and a first action based on a reward function with the one or more data as a first variable, with the first action identifying a potential second operation of the autonomous vehicle during a second transition from the second driving state to the third driving state;
    determine at least one next driving state and at least one next action based on the second driving state and a reward matrix, with each next driving state of the at least one next driving state corresponding to one of the at least one next action;
    determine a second transition indication including a fourth driving state and a second action based on the first transition indication and the at least one next driving state, and the at least one next action; and
    generate a vehicle speed control signal based on the second action.

17. The non-transitory computer-readable storage medium of claim 16, wherein the operations further determining a plurality of route segments between a source and a destination, with each route segment comprising an assigned state having a speed limit and a road curvature for each respective route segment.

18. The non-transitory computer-readable storage medium of claim 17, wherein the operations further updating the vehicle speed control signal for each of the plurality of route segments.

19. The non-transitory computer-readable storage medium of claim 18, wherein the operations further updating the vehicle speed control signal based on passenger comfort rating and speed rating.

* * * * *

UNITED STATES PATENT AND TRADEMARK OFFICE
CERTIFICATE OF CORRECTION

PATENT NO. : 10,029,698 B2
APPLICATION NO. : 15/213532
DATED : July 24, 2018
INVENTOR(S) : Rao et al.

It is certified that error appears in the above-identified patent and that said Letters Patent is hereby corrected as shown below:

In the Specification

Column 5, Line 36: replace "faclue" with --value--
Column 8, Line 38: replace "requesting by" with --requesting--

Signed and Sealed this
Fourth Day of October, 2022

Katherine Kelly Vidal
*Director of the United States Patent and Trademark Office*